Nov. 22, 1927.    1,650,576
J. W. WELSH
OPHTHALMIC MOUNTING
Filed March 10, 1923

Inventor;
James W. Welsh.
by David Rines
Attorney;-

Patented Nov. 22, 1927.

1,650,576

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed March 10, 1923. Serial No. 624,126.

The present invention relates to ophthalmic mountings, and more particularly to mountings constituted of zylonite, celluloid and other compositions, horn, shell and the like.

In some types of non-metallic spectacle temples, a metal reinforcing rod, that is enclosed within a nonmetallic tube, is supplemented by a separate metal hinge plate that is provided at the forward end of the temple. There is a tendency for the nonmetallic tube to break, near the junction between the hinge plate and the reinforcing rod, into two parts, one containing the reinforcing rod and the other the hinge plate. This is particularly true where the hinge plate is provided with sharp biting spurs or other elements that bite into the nonmetallic material and weaken it. It has therefore been proposed to form the reinforcing rod and the hinge plate in one piece; but this proposal may be too costly, because requiring that the hidden reinforcing rod, which could otherwise be constituted of base metal, must be of the same more valuable metal as the more conspicuous hinge plate. In the more usual case, it is desired to have the reinforcing rod of a light-weight metal, like aluminum, and this metal would not have the strength required of a hinge plate.

It is accordingly an object of the present invention to provide a spectacle temple having a reinforcing rod and a hinge element constituted of different metals, that shall be unprovided with sharp, weakening biting parts, and on which the junction between the hinge element and the reinforcing rod shall be situated at a point that is not ordinarily subjected to strain.

Figure 1:
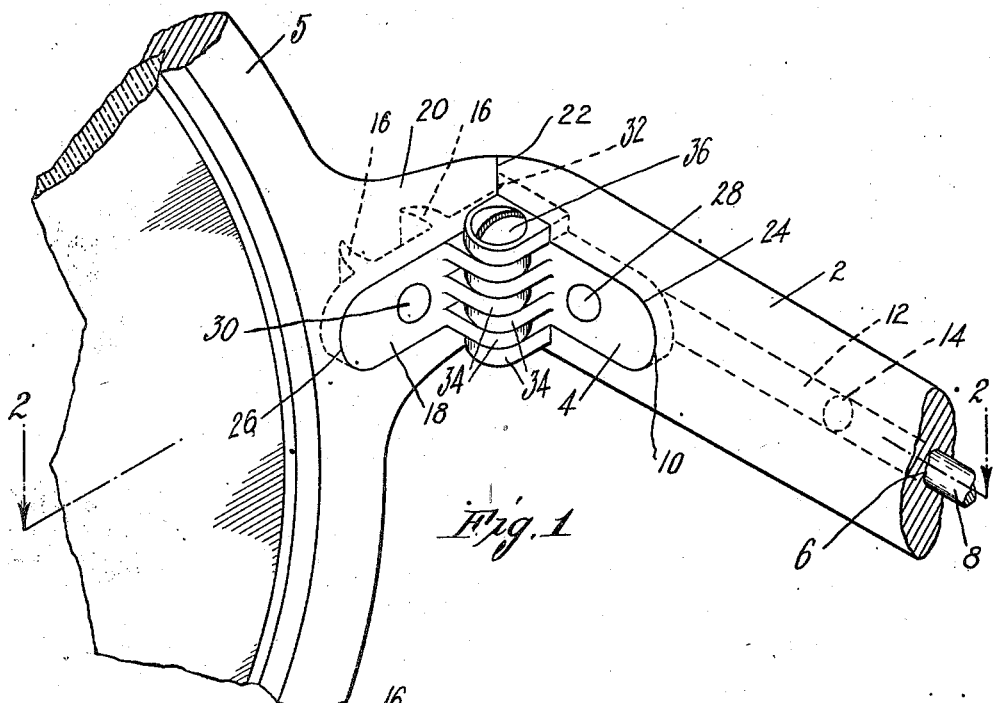
Figure 2:
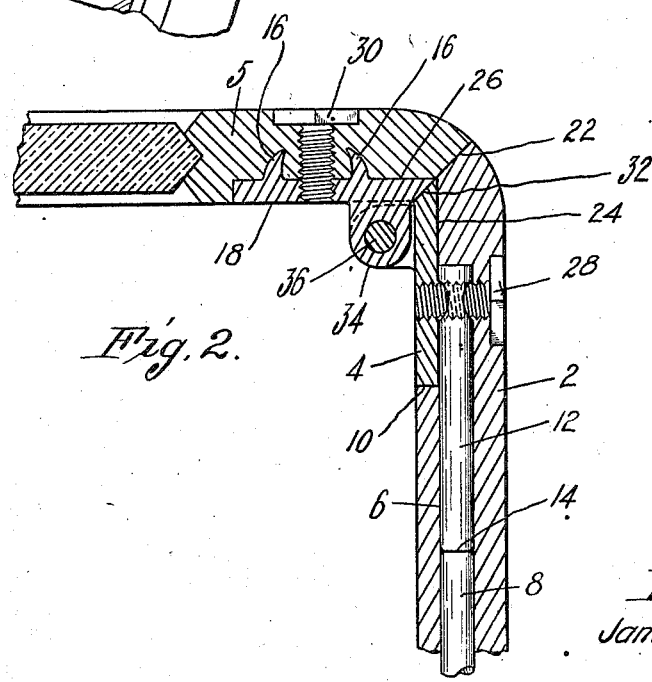

Other objects of the invention will be made clear by the following description, taken in connection with the accompanying drawings, in which Fig. 1 is a fragmentary perspective view of an ophthalmic mounting constructed according to a preferred embodiment of the present invention; and Fig. 2 is a section taken upon the line 2—2 of Fig. 1, looking in the direction of the arrows.

The preferred temple of the present invention comprises a non-metallic member, shown as a seamless tube 2, provided at its forward end with a hinge plate 4, whereby it may be hinged to a spectacle-lens frame 5. Within the bore 6 of the tube is completely enclosed a reinforcing member, shown as a metal rod 8. The hinge plate 4 may, for example, be of nickel, and the reinforcing rod 8 of aluminum. According to prior practice, the reinforcing rod has extended up to a point very close to the end 10 of the hinge plate 4. This has resulted in the tube 2 breaking near the point 10, where the greatest strains are set up in flexing the temple. According to the present invention, the parts near the point 10 are protected by a rod extension 12 that is integral with the hinge plate 4. The rod extension 12 is offset from the hinge plate 4 which enables it to lie in the bore 6 of the tube 2 and the hinge plate 4 to lie flush with a face of the tube 2, as illustrated. The rod extension 12 extends into the bore 6 for a substantial distance, up to the point 14, where the strains do not occur in ordinary use. The reinforcing rod 8 contacts with the rod extension 12 at 14, providing for reinforcing the tube 2 throughout. The rod extension 12 may be constituted of metal that is easily soldered to the hinge plate 4, or it may be integrally connected to the hinge plate 4 in some other manner.

The hinge plate 4 is unprovided with biting spurs or the like, which would weaken the non-metallic tube near the point 10, and so induce breakage. There is not the same cause to fear the use of biting spurs 16 upon the other hinge plate 18 that is secured to the end piece 20 of the spectacle-lens frame 5, because the end piece 20 is more rugged than the temple tube 2, and so does not yield so readily to strain.

The end piece 20 and the adjacent end of the temple tube 2 are both beveled, the beveled ends being adapted to contact, as shown at 22. The hinge plates 4 and 18 are seated in countersunk recesses 24 and 26, respectively, of the temple and the end piece, and are secured in the recesses by rivets or similar members 28 and 30, the rivet 28 extending through the rod extension 12, as well. The hinge plates 4 and 18 are provided with beveled ends that are flush with the corresponding beveled ends of the temple and the end piece, respectively, as indicated at 32. The beveled ends of the hinge plates thus serve as a metal stop to protect the beveled ends of the end piece 20 and of the temple when the temple is opened, as shown in the drawings. The hinge plates are provided with cooperating perforated knuckles 34, through the perforations of which extends a pintle 36 for connecting the hinge plates together.

Modifications will, of course, occur to persons skilled in the art. Such modifications are regarded as falling within the spirit and scope of the present invention, and are intended to be covered by the appended claims.

What is claimed is:

1. A spectacle temple comprising a non-metallic tube, a metal hinge plate mounted on the tube having an integral rod extension mounted in the tube, and a reinforcing rod constituted of different metal mounted in the tube and contacting with the rod extension.

2. A spectacle temple comprising a non-metallic tube, a metal hinge plate mounted on the tube and provided with a rod extension for projecting the portion of the tube near the hinge plate from the strains caused by flexing the temple, a member extending through the hinge plate and the tube for securing the hinge plate to the tube, and a separate reinforcing rod in the tube.

3. An opthalmic mounting having, in combination, a lens-holding frame having an end piece constituted of non-metallic material, a temple comprising a non-metallic member, a hinge connecting the frame and the temple comprising two pivoted metal hinge elements respectively mounted on the end piece and the member, the hinge element that is mounted on the temple member being integrally provided with an extension for protecting the portion of the temple near the hinge element from the strains caused by flexing the temple, and a separate reinforcing rod for the temple member.

4. An ophthalmic mounting having, in combination, a lens-holding frame having an end piece constituted of non-metallic material, a temple comprising a non-metallic tube, and a hinge connecting the frame and the temple comprising two pivoted metal hinge plates, one of the hinge plates having means biting into the end piece, and the other hinge plate being unprovided with spurs but having an integral rod extension mounted in the temple tube, a rod constituted of different metal being mounted in the tube in contact with the rod extension.

5. An ophthalmic mounting having, in combination, a lens frame having an end piece constituted of non-metallic material provided with a beveled end, a non-metallic temple having a beveled end adapted to contact with the beveled end of the end piece, the end piece and the temple each being provided with a countersunk recess extending from the corresponding beveled end, a hinge plate seated in each recess having a beveled end flush with the corresponding beveled end of the temple and of the end piece, respectively, the hinge plates having cooperating perforated knuckles, and a pintle extending through the perforations in the knuckles, the hinge plate that is seated in the recess of the end piece having a plurality of spurs biting into the end piece, and the other hinge plate having an integral rod extension for protecting the portion of the temple near the hinge plate from the strains caused by flexing the temple.

In testimony whereof, I have hereunto subscribed my name this 7th day of March, 1923.

JAMES W. WELSH.

Certificate of Correction.

Patent No. 1,650,576.                                  Granted November 22, 1927, to

JAMES W. WELSH.

It is hereby certified that error appears in the printed specification of the above-numbered patent requiring correction as follows: Page 2, line 24, claim 2, for the word " projecting " read *protecting;* and that the said Letters Patent should be read with this correction therein that the same may conform to the record of the case in the Patent Office.

Signed and sealed this 13th day of December, A. D. 1927.

[SEAL.]
M. J. MOORE,
*Acting Commissioner of Patents.*